(12) United States Patent  (10) Patent No.: US 7,931,393 B2
Stempinski  (45) Date of Patent: Apr. 26, 2011

(54) BACK-LIT VEHICLE EMBLEM

(76) Inventor: Stephan M. Stempinski, Delray Beach, FL (US)

( * ) Notice: Subject to any disclaimer, the term of this patent is extended or adjusted under 35 U.S.C. 154(b) by 0 days.

(21) Appl. No.: 12/549,480

(22) Filed: Aug. 28, 2009

(65) Prior Publication Data

US 2011/0051451 A1  Mar. 3, 2011

(51) Int. Cl.
*F21V 33/00* (2006.01)

(52) U.S. Cl. ........................................................ 362/496

(58) Field of Classification Search ................... 362/496
See application file for complete search history.

(56) References Cited

U.S. PATENT DOCUMENTS

| | | | |
|---|---|---|---|
| 1,402,479 A | 1/1922 | Causon | |
| 1,629,231 A | 5/1927 | Stover | |
| 4,443,832 A * | 4/1984 | Kanamori et al. | 362/84 |
| 4,879,826 A * | 11/1989 | Wittke | 40/551 |
| 4,965,950 A * | 10/1990 | Yamada | 40/546 |
| 4,977,695 A * | 12/1990 | Armbruster | 40/541 |
| 5,211,466 A | 5/1993 | Jarocki et al. | |
| 5,939,979 A * | 8/1999 | Lee | 340/479 |
| 6,190,026 B1 | 2/2001 | Moore | |
| 6,729,055 B2 * | 5/2004 | Chou | 40/546 |
| 6,735,893 B2 * | 5/2004 | Wolf | 40/591 |
| 7,108,411 B2 * | 9/2006 | Pommeret et al. | 362/496 |
| 7,175,324 B2 * | 2/2007 | Kwon | 362/545 |
| 7,387,397 B2 | 6/2008 | Konet et al. | |
| 2002/0105812 A1 * | 8/2002 | Zimmermann et al. | 362/487 |
| 2003/0037472 A1 | 2/2003 | Nolan | |
| 2006/0023468 A1 * | 2/2006 | Takahashi et al. | 362/555 |
| 2008/0090031 A1 * | 4/2008 | Hirzmann | 428/31 |

FOREIGN PATENT DOCUMENTS

| | | |
|---|---|---|
| CN | 2815776 Y | 9/2006 |
| CN | 2815777 Y | 9/2006 |
| CN | 2905560 Y | 5/2007 |
| DE | 20200400917 U1 | 6/2004 |
| FR | 2723710 A3 | 2/1996 |
| FR | 2848943 A1 | 6/2004 |
| FR | 2884199 A1 | 10/2006 |
| JP | 5213124 A | 8/1993 |
| JP | 8002342 A | 1/1996 |
| JP | 2004051046 A | 2/2004 |

* cited by examiner

*Primary Examiner* — Laura Tso
(74) *Attorney, Agent, or Firm* — Christopher & Weisberg, P.A.

(57) ABSTRACT

A back-lit vehicle emblem (1) having a body (2) with a front surface (3) and a rear surface (4). The body may be in the shape of a logo, lettering showing the make and model of a vehicle or any other design, such as a sports team's logo, a religious symbol, etc. At least one light emitting diode ("LED") (5), is located in a hollow portion (6) of the body. The rear surface has at least one edge (7) with at least one partially raised edge (8) so that when the at least one LED is activated, light emitted from the at least one LED shines under the raised edge of the back-lit emblem, thereby illuminating the emblem. The back-lit vehicle emblem may have at least one spacer (10) located on the rear surface that creates a space between the rear surface of the back-lit vehicle emblem and a vehicle (14). In addition, predetermined areas of the front surface of the back-lit vehicle emblem may be translucent areas (9) to allow even surfaced emblems to be illuminated.

7 Claims, 2 Drawing Sheets

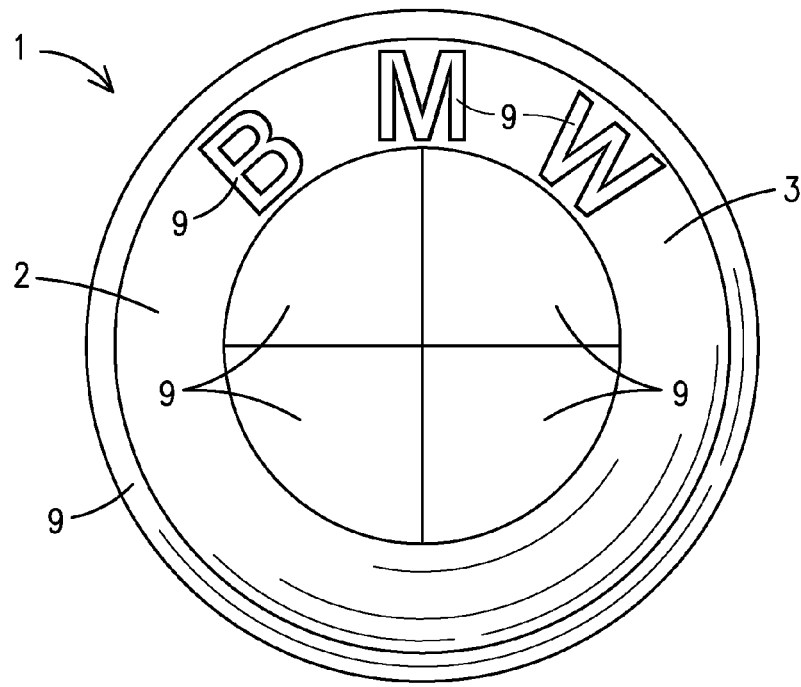
FIG. 3
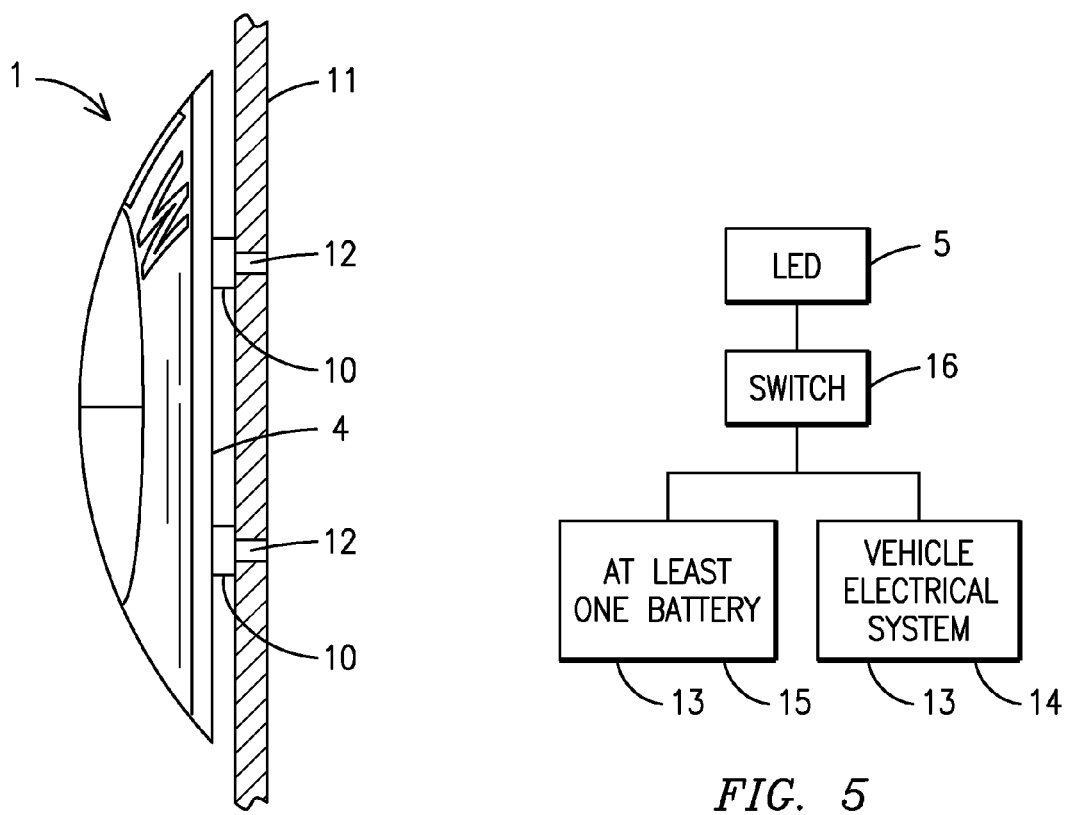
FIG. 4
FIG. 5

BACK-LIT VEHICLE EMBLEM

BACKGROUND OF THE INVENTION

This invention relates to emblems for vehicles, more particularly, a back-lit emblem for vehicles having at least one light emitting diode ("LED") embedded within the emblem that emits light from the rear of the emblem, thereby illuminating the emblem at night and adding to the overall visual appearance of the vehicle.

Emblems are commonly placed on vehicles to indicate which company manufactured the vehicle and/or the model of the vehicle. Emblems may be in the shape of a logo, lettering showing the make and model of a vehicle or any other design, such as a sports team's logo, a religious symbol, etc. Emblems are normally placed on the front portion of a car hood, the front grill and/or the rear of the vehicle. A problem with current emblems is that they cannot be seen in the dark.

Therefore, a need exists for a back-lit emblem for vehicles that allows the emblem to be seen at night and increases the overall visual appearance of a vehicle.

The relevant prior art includes the following references:

| Pat. No. (U.S. unless stated otherwise) | Inventor | Issue/Publication Date |
| --- | --- | --- |
| 7,387,397 | Konet, et al. | Jun. 17, 2008 |
| CN2905560Y | Guohui, et al. | May 30, 2007 |
| 7,175,324 | Kwon | Feb. 13, 2007 |
| FR2884199A1 | Convers, et al. | Oct. 13, 2006 |
| CN2815776Y | Guohui, et al. | Sep. 13, 2006 |
| CN2815777Y | Guohui, et al. | Sep. 13, 2006 |
| JP2004051046A | Hanamoto | Feb. 19, 2004 |
| DE20200400491 | Debusch | Jun. 03, 2004 |
| FR2848943A1 | Roche, et al. | Jun. 25, 2004 |
| 2003/0037472 | Nolan | Feb. 27, 2003 |
| 6,190,026 | Moore | Feb. 20, 2001 |
| JP8002342A | Mochizuki | Jan. 09, 1996 |
| FR2723710A3 | Georges | Feb. 23, 1996 |
| 5,211,466 | Jarocki, et al. | May 18, 1993 |
| JP5213124A | Suzuki | Aug. 24, 1993 |
| 1,629,231 | Stover | May 17, 1927 |
| 1,402,479 | Causon | Jan. 03, 1922 |

SUMMARY OF THE INVENTION

The primary object of the present invention is to provide a back-lit vehicle emblem that can be seen at night.

Another object of the present invention is to provide a back-lit vehicle emblem that increases the overall visual appearance of a vehicle.

An even further object of the present invention is to provide a back-lit vehicle emblem that is easy to install on a vehicle.

The present invention fulfills the above and other objects by providing a back-lit emblem for vehicles having a body with a front surface and a rear surface. Emblems may be in the shape of a logo, lettering showing the make and model of a vehicle or any other design, such as a sports team's logo, a religious symbol, etc. At least one light emitting diode ("LED") is located behind or in a back portion of the body. The rear surface has at least one edge that is partially raised so that when the at least one LED is activated, light emitted from the at least one LED shines under the raised edge of the back-lit emblem and reflects off of the emblem and vehicle paint, thereby illuminating the emblem. Alternatively, the back-lit vehicle emblem may have at least one spacer located on the rear surface that creates a space between the rear surface of the back-lit vehicle emblem and a vehicle, thereby allowing light from the at least one LED to shine through the space and illuminate the emblem.

The at least one LED is connected to a power source. The power source may be an electrical system of vehicle that activates the at least one LED whenever the headlights and license plate lights of the vehicle are activated or when the brake lights are activated. The power source may also be at least one battery that allows a user to activate the at least one LED independently of the headlights, thereby allowing the emblem to be illuminated even if the vehicle lights are not illuminated.

In addition, predetermined areas of the front surface of the back-lit vehicle emblem may be translucent, depending on the design of the logo being illuminated. The translucent areas of the front surface would allow light emitted from the at least one LED to shine through the front surface, thereby adding to the appearance of the back-lit vehicle emblem.

The above and other objects, features and advantages of the present invention should become even more readily apparent to those skilled in the art upon a reading of the following detailed description in conjunction with the drawings wherein there is shown and described illustrative embodiments of the invention.

BRIEF DESCRIPTION OF THE DRAWINGS

In the following detailed description, reference will be made to the attached drawings in which:

FIG. 3 is a front view of a back-lit vehicle emblem of the present invention having a front surface with at least one translucent area;

FIG. 4 is a side partial cutaway view of a back-lit vehicle emblem of the present invention having at least one spacer and mounted on a vehicle;

FIG. 5 is a block diagram showing a back-lit vehicle emblem of the present invention and alternate power sources.

DESCRIPTION OF THE PREFERRED EMBODIMENTS

Figure 1:
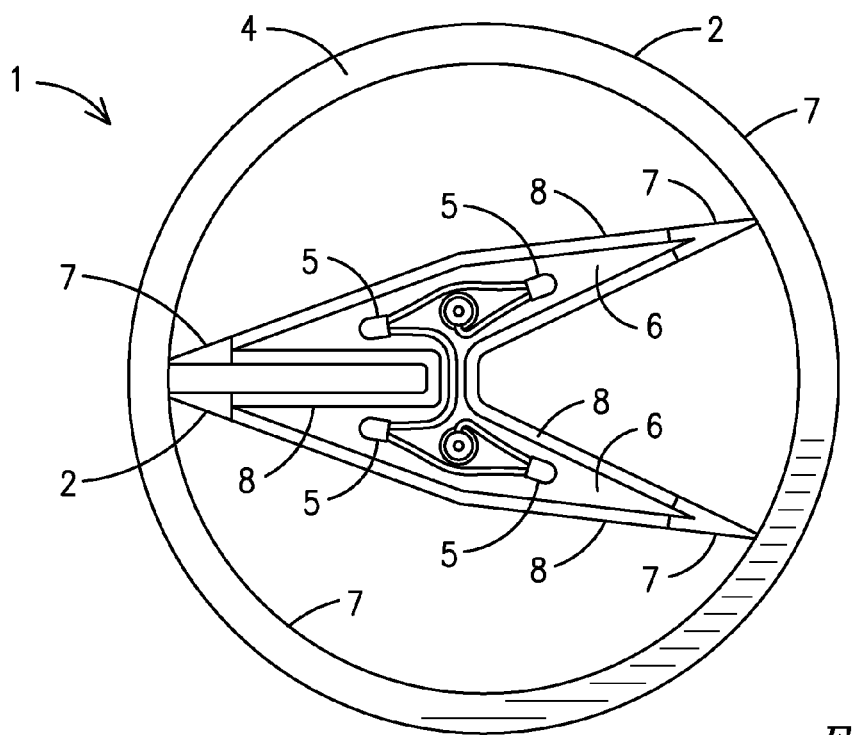
FIG. 1 is a rear view of a back-lit vehicle emblem of the present invention.

For purposes of describing the preferred embodiment, the terminology used in reference to the numbered accessories in the drawings is as follows:

| | |
| --- | --- |
| 1. | back-lit vehicle emblem |
| 2. | body |
| 3. | front surface |
| 4. | rear surface |
| 5. | light emitting diode ("LED") |
| 6. | hollow portion |
| 7. | edge |
| 8. | raised edge |
| 9. | translucent area |
| 10. | spacer |
| 11. | vehicle |
| 12. | mounting means |
| 13. | power source |
| 14. | vehicle electrical system |
| 15. | battery |
| 16. | switch |

Figure 2:
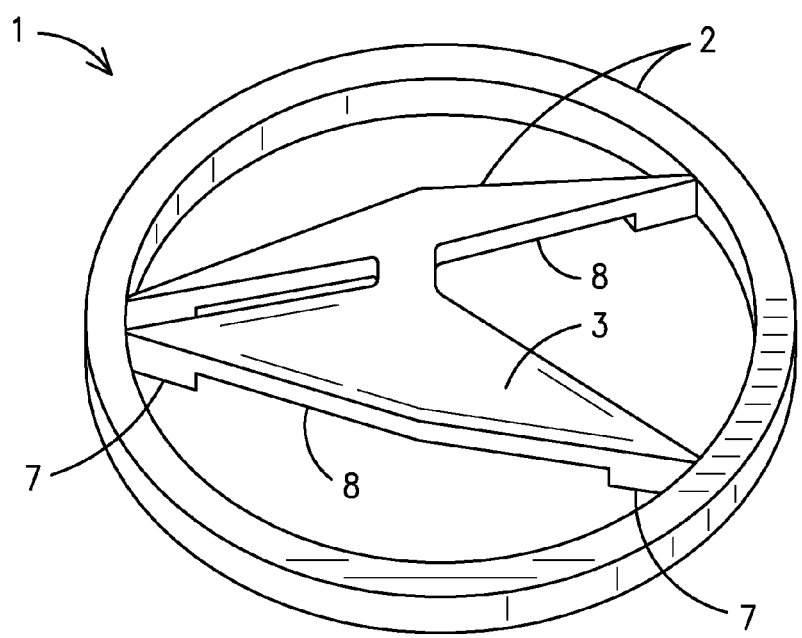
FIG. 2 is a side perspective view of a back-lit emblem of the present invention having at least one raised edge.

With reference to FIG. 1 a rear view of a back-lit vehicle emblem 1 of the present invention is shown. The back-lit vehicle emblem 1 for vehicles has a body 2 with a front surface 3, as shown in FIG. 2, and a rear surface 4. The body 2 may be in the shape of a logo, lettering showing the make and model of a vehicle or any other design, such as a sports team's logo, a religious symbol, etc. At least one light emitting diode ("LED") 5, is located in a hollow portion 6 of the body 2. The rear surface 4 has at least one edge 7. A portion of the at least one edge 7 is a raised edge 8 so that when the at least one LED 5 is activated, light emitted from the at least one LED 5 will shine under the raised edge 7 of the back-lit emblem 1, thereby illuminating the emblem.

Now referring to FIG. 2, a side perspective view of a back-lit vehicle emblem 1 of the present invention having at least one raised edge 8 is shown. The back-lit vehicle emblem 1 for vehicles has a body 2 with a front surface 3 and a rear surface 4 as shown in FIG. 1. The rear surface 4 has at least one edge 7. A portion of the at least one edge 7 is a raised edge 8 so that when the at least one LED 5 is activated, light emitted from the at least one LED 5 will shine under the raised edge 7 of the back-lit vehicle emblem 1, thereby illuminating the emblem.

Now referring to FIG. 3, a front view of a back-lit vehicle emblem 1 of the present invention having a front surface 3 with at least one translucent area 9 is shown. The back-lit vehicle emblem 1 has a body 2 with a front surface 3. The body 2 may be in the shape of a logo, lettering showing the make and model of a vehicle or any other design, such as a sports team's logo, a religious symbol, etc. Either all or only predetermined portions of the front surface may have at least one translucent area 9, depending on the design of the back-lit vehicle emblem 1 being illuminated. At least one light emitting diode ("LED") 5, is located in a hollow portion 6 of the body 2, as shown in FIG. 1. When the at least one LED 5 is activated, light emitted from the at least one LED 5 will shine through the at least one translucent area 9, thereby illuminating the back-lit vehicle emblem 1.

Now referring to FIG. 4, a side partial cutaway view of a back-lit vehicle emblem 1 of the present invention having at least one spacer 10 and mounted on a vehicle 11 is shown. The back-lit vehicle emblem 1 is mounted to a vehicle 11 using a mounting means 12, such as an adhesive, double sided tape, screws, nuts and bolts, etc. The back-lit emblem 1 has at least one spacer 9 located on a rear surface 4 that creates a space between the rear surface 4 of the back-lit vehicle emblem 1 and the vehicle 10, thereby allowing light from the at least one LED 5, as shown in FIG. 1, to shine through the space, thereby illuminating the back-lit vehicle emblem 1.

Finally referring to FIG. 5, a block diagram showing at least one LED 5 of the present invention and power sources 13. The at least one LED 5 is connected to a power source 13 that supplies power to the at least one LED 5. The power source 13 may be the electrical system 14 of a vehicle that will activate the at least one LED 5 whenever headlights of the vehicle are activated or the brake lights are activated. Alternatively, the power source 13 may be at least one battery 15 that allows a user to activate the at least one LED 5 independently of an electrical system 14 of a vehicle, thereby allowing the emblem to be illuminated even if the vehicle lights are not illuminated. The at least one LED 5 may also be activated or deactivated with a switch 16 located between the power source 13 and the at least one LED 5.

It is to be understood that while a preferred embodiment of the invention is illustrated, it is not to be limited to the specific form or arrangement of parts herein described and shown. It will be apparent to those skilled in the art that various changes may be made without departing from the scope of the invention and the invention is not to be considered limited to what is shown and described in the specification and drawings.

Having thus described my invention, I claim:

1. A back-lit vehicle emblem, comprising:
    a body that exhibits the emblem, the body being mountable on the vehicle to provide a space between at least a portion of the body and the vehicle and further being at least partially hollowed out, the hollowed out portion including an LED directed to transmit light from the hollowed out portion back toward the vehicle through the space between the body and the vehicle to be reflected off a surface of the vehicle to reflect away from the vehicle surface, the light illuminating at least one edge of the body via the reflection off the surface of the vehicle.

2. The vehicle emblem of claim 1, wherein the at least one edge follows a contour of the emblem.

3. The vehicle emblem of claim 2, wherein the at least one edge is raised from the surface of the vehicle to allow light to pass outward through the space between the edge and the vehicle.

4. The vehicle emblem of claim 3, wherein the space between at least a portion of the body and the vehicle is formed by the raised edge.

5. The vehicle emblem of claim 1, wherein the space between at least a portion of the body and the vehicle is formed by mounting a spacer between the body and the vehicle.

6. The vehicle emblem of claim 1, wherein the light illuminates one or more contours of the emblem that outline a substantial portion of the emblem.

7. The vehicle emblem of claim 1, wherein the hollowed out portion includes a plurality of LEDs distributed to provide lighting of at least substantially an entire edge of the emblem.

* * * * *